United States Patent [19]
Ogiwara

[11] Patent Number: 5,946,080
[45] Date of Patent: Aug. 31, 1999

[54] HEATING DEVICE

[75] Inventor: Nagao Ogiwara, Kanagawa, Japan

[73] Assignee: Fuji Photo Film Co., Ltd., Kanagawa, Japan

[21] Appl. No.: 08/868,672

[22] Filed: Jun. 4, 1997

[30] Foreign Application Priority Data

Jun. 7, 1996 [JP] Japan .................................. 8-146058

[51] Int. Cl.⁶ .......................... G03B 27/30; G03B 27/32; G03B 27/04; H05B 1/00
[52] U.S. Cl. ............................. 355/97; 355/27; 355/100; 219/216
[58] Field of Search ................................ 355/27, 97, 100, 355/30, 35, 72; 396/575; 219/638, 216; 250/316.1, 317.1, 318, 319

[56] References Cited

U.S. PATENT DOCUMENTS

| | | | |
|---|---|---|---|
| 4,918,486 | 4/1990 | Nakamura et al. | 355/27 |
| 5,113,211 | 5/1992 | Matsumoto | 355/27 |
| 5,572,285 | 11/1996 | Takagi | 355/27 |
| 5,587,767 | 12/1996 | Islam et al. | 355/27 |

*Primary Examiner*—Safet Metjahic
*Assistant Examiner*—Peter Kim
*Attorney, Agent, or Firm*—Sughrue, Mion, Zinn, Macpeak & Seas, PLLC

[57] ABSTRACT

A heating device, in which a photosensitive material and an image receiving material can be heated quickly and which has a reduced number of parts. A plate-shaped heating plate, which can move reciprocally within the device, is provided at a heat development transfer section. Attaching/peeling rollers, which can move closer to and away from the heating plate, are disposed above the heating plate. Further, a photosensitive material peeling pawl and an image receiving material peeling pawl are provided on the sides of the attaching/peeling rollers. During two reciprocal movements of the heating plate, the photosensitive material and the image receiving material are loaded on the heating plate, heat-development-transferred, and peeled. Because the respective materials are pressed by the attaching/peeling rollers and adhered to the heating plate, good heat development transfer can be effected in a short time. Moreover, since the pressures of the attaching/peeling rollers are decreased at the time of peeling of the materials, the materials can be peeled easily by the respective peeling pawls.

20 Claims, 6 Drawing Sheets

HEATING DEVICE

BACKGROUND OF THE INVENTION

1. Field of the Invention

The present invention relates to a heating device which is applied to an image forming apparatus using a photosensitive material and an image receiving material, and which heats the photosensitive material when images are transferred from the photosensitive material to the image receiving material.

2. Description of the Related Art

A heating device is provided at an image forming apparatus which uses two types of image recording materials, i.e., a photosensitive material and an image receiving material, so as to effect an image recording process. The heating device heats the photosensitive material and the image receiving material in a superposed state and carries out heat development transfer from the photosensitive material to the image receiving material.

As such heating device, a type of heating device is known which includes a cylindrical heating drum in which a heater is accommodated therewithin and heats the circumferential surface thereof, an attaching roller in which a photosensitive material and an image receiving material are superposed and attached to the periphery of the heating drum, and an endless pressing/contacting belt which is disposed at the periphery of the heating drum and trained around a plurality of rollers.

Namely, in this type of heating device, the endless pressing/contacting belt is rotated (traveled) and the heating drum is rotated following the rotation of the endless pressing/contacting belt. In this state, the photosensitive material and the image receiving material are superposed by the attaching roller and trained around the outer periphery of the heating drum. Further, as the photosensitive material and the image receiving material are heated in this state, images can be heat-development-transferred from the photosensitive material to the image receiving material.

On the other hand, in addition to such type of heating device, a heating device is invented which includes a pair of endless belts which are trained around a plurality of rollers and are disposed so as to oppose each other in a pressed and contacted state, and a heating plate which is disposed within the loops of these endless belts and heats the photosensitive material and the image receiving material via the endless belts.

Namely, in this type of heating device, when the photosensitive material and the image receiving material are positioned at the upstream sides of the endless belts in the conveying directions thereof, the endless belts are rotated in a predetermined direction, and the photosensitive material and the image receiving material are taken up between the endless belts so as to be superposed. In this state, the photosensitive material and the image receiving material are conveyed. Next, when the photosensitive material and the image receiving material are conveyed via the endless belts to the position which opposes the heating plate, the rotations of the endless belts are stopped. In this state, the photosensitive material and the image receiving material are heated by the heating plate for a predetermined period of time. In this way, heat development transfer is carried out and images can be formed on the image receiving material.

In the above-described type of heating device in which the photosensitive material and the image receiving material are conveyed by the pair of endless belts, there is a drawback in that the time required to heat-development-transfer from the photosensitive material to the image receiving material is long. Namely, in this type of heating device, the photosensitive material and the image receiving material are heated by the heating plate via the endless belts. Further, when the endless belts are separated from the heating plate due to the rotations of the endless belts, the endless belts are cooled, such that the endless belts need to be heated again at the time of heating the photosensitive material and the image receiving material.

In order to solve the problem, for example, a method is considered in which a preheating plate whose surface temperature is higher than that of a main heating plate for heat development transfer is disposed at the upstream side of the heating plate in the conveying directions of the photosensitive material and the image receiving material. In accordance with this method, while the photosensitive material and the image receiving material are conveyed by the endless belts to the position which opposes the heating plate, the endless belts are heated in advance by the preheating plate, and additionally, the photosensitive material and the image receiving material are heated in advance. Consequently, heat development transfer of the photosensitive material and the image receiving material can be carried out in a short time. However, because the preheating plate is required in addition to the main heating plate, a drawback arises in that the heating device becomes expensive. Further, in this type of heating device, because a greater number of parts such as a pair of belts, a plurality of rollers around which these belts are trained, a plurality of heating plates, and the like are required, the overall cost of the heating device becomes high.

As compared to such heating device, in the type of heating device which uses the heating drum, since the photosensitive material and the image receiving material are directly trained around the outer periphery of the heating drum, there is no drawback such as the time required for heat development transfer becoming long. However, in this type of heating device, because the surface of the heating drum around which the photosensitive material and the image receiving material are trained is curved, in order that the photosensitive material and the image receiving material are properly trained around the outer periphery of the heating drum, it is necessary that the entire surfaces of the photosensitive material and the image receiving material, in particular, the end portions thereof, are pressed invariably against the heating drum. As a result, a greater number of parts such as a plurality of rollers, endless pressing/contacting belts, and the like are needed, and the cost of the heating devise becomes high.

SUMMARY OF THE INVENTION

With the aforementioned in view, an object of the present invention is to provide a heating device in which a photosensitive material and an image receiving material can be heated quickly and the number of parts can be reduced.

In accordance with the first aspect of the present invention, a heating device in which a photosensitive material, onto which images have been exposed, and an image receiving material, to which the images of the photosensitive material are transferred, are superposed and heated so as to effect heat development transfer. The heating device includes: a heating plate which is formed in the shape of a flat plate and which is provided so as to be movable in predetermined directions, said heating plate heating said photosensitive material and said image receiving material while moving in said predetermined directions in a state in which said photosensitive material and said image receiving material are loaded on said heating plate; and attaching members which are disposed so as to oppose said heating plate, said attaching members applying predetermined pressures to said photosensitive material and said image receiving material while said photosensitive material and said image receiving material are nipped between said attaching members and said heating plate such that said photosensitive material and said image receiving material are adhered to said heating plate.

In the above-structured heating device, the photosensitive material and the image receiving material are loaded on the heating plate. When the heating plate moves in the predetermined directions in this state, the photosensitive material and the image receiving material are adhered to the heating plate by the attaching members. While the heating plate moves in this state, the photosensitive material and the image receiving material are heated by the heating plate, and the images are heat-development-transferred from the photosensitive material to the image receiving material.

In the heating device of the present invention, because the photosensitive material and the image receiving material are directly loaded on the heating plate and adhered to the heating plate by the attaching members, the photosensitive material and the image receiving material are heated quickly and uniformly, and good images are transferred. Further, because the heating plate is formed in the shape of a flat plate, it is not necessary to press the entire surfaces of the photosensitive material and the image receiving material against the heating plate by using an endless belt or the like. The entire surfaces of the photosensitive material and the image receiving material are desirably adhered to the heating plate by the pressures of the attaching members. As a result, there is no need to provide a member for pressing the photosensitive material and the image receiving material, and the number of parts can be reduced.

A heating device in accordance with the second aspect of the invention is a heating device according to the first aspect, wherein said heating plate is provided so as to be able to move reciprocally within a predetermined range, wherein said attaching members are rotating rollers, wherein peeling pawls are provided in the vicinities of said rotating rollers and peel said photosensitive material and said image receiving material from said heating plate in conjunction with said reciprocal movement of said heating plate. When said heating plate moves backward, pressures of said rotating rollers are released, and wherein when said heating plate moves forward again, said peeling pawls are operated so as to peel said photosensitive material and said image receiving material.

In the above-structured heating device, when the first forward movement of the heating plate starts, the photosensitive material and the image receiving material receive predetermined pressures from the rotating rollers so as to be adhered to the heating plate. Next, when the first forward movement of the heating plate ends and the backward movement thereof starts, the pressures of the rotating rollers applied to the photosensitive material and the image receiving material are released. During the reciprocal movement of the heating plate, the photosensitive material and the image receiving material receive heat from the heating plate so as to be heated. The images are heat-development-transferred from the photosensitive material to the image receiving material.

When the heating plate moves forward, the photosensitive material and the image receiving material are adhered to the heating plate by the rotating rollers. Accordingly, the entire surfaces of the photosensitive material and the image receiving material are heated quickly and uniformly. Further, when the backward movement of the heating plate starts, the pressures of the rotating rollers, which rotate in the same way as the time in which the heating plate moves forward, are released. Consequently, deviations or cockles of the photosensitive material and the image receiving material are prevented, and the photosensitive material and the image receiving material are kept adhered onto the heating plate even at the time of backward movement.

Next, when the backward movement of the heating plate ends and the forward movement thereof starts again, the photosensitive material and the image receiving material are pressed by the rotating rollers, and the peeling pawls operate with the forward movement of the heating plate. In this way, the photosensitive material and the image receiving material are peeled from the heating plate.

In the heating device of the present invention, as the heating plate moves reciprocally a plurality of times within the predetermined range, a series of processes which is need for the heat development transfer, such as loading onto the heating plate, heating, peeling and the like, of the photosensitive material and the image receiving material is performed. Therefore, the moving range of the heating plate required for the heat development transfer is decreased and the entire device can be made compact.

A heating device in accordance with the third aspect of the present invention is a heating device according to the second aspect, wherein said pressures of said rotating rollers can be increased and decreased, and when said heating plate moves forward again, the pressures of said rotating rollers are smaller than the pressures of said rotating rollers at the first forward movement of said heating plate.

In the above-structured heating device, the pressures of the rotating rollers at the time of the second forward movement of the heating plate are smaller than those at the time of the first forward movement thereof. Accordingly, at the time of the second forward movement of the heating plate, the photosensitive material and the image receiving material are easily peeled therefrom.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
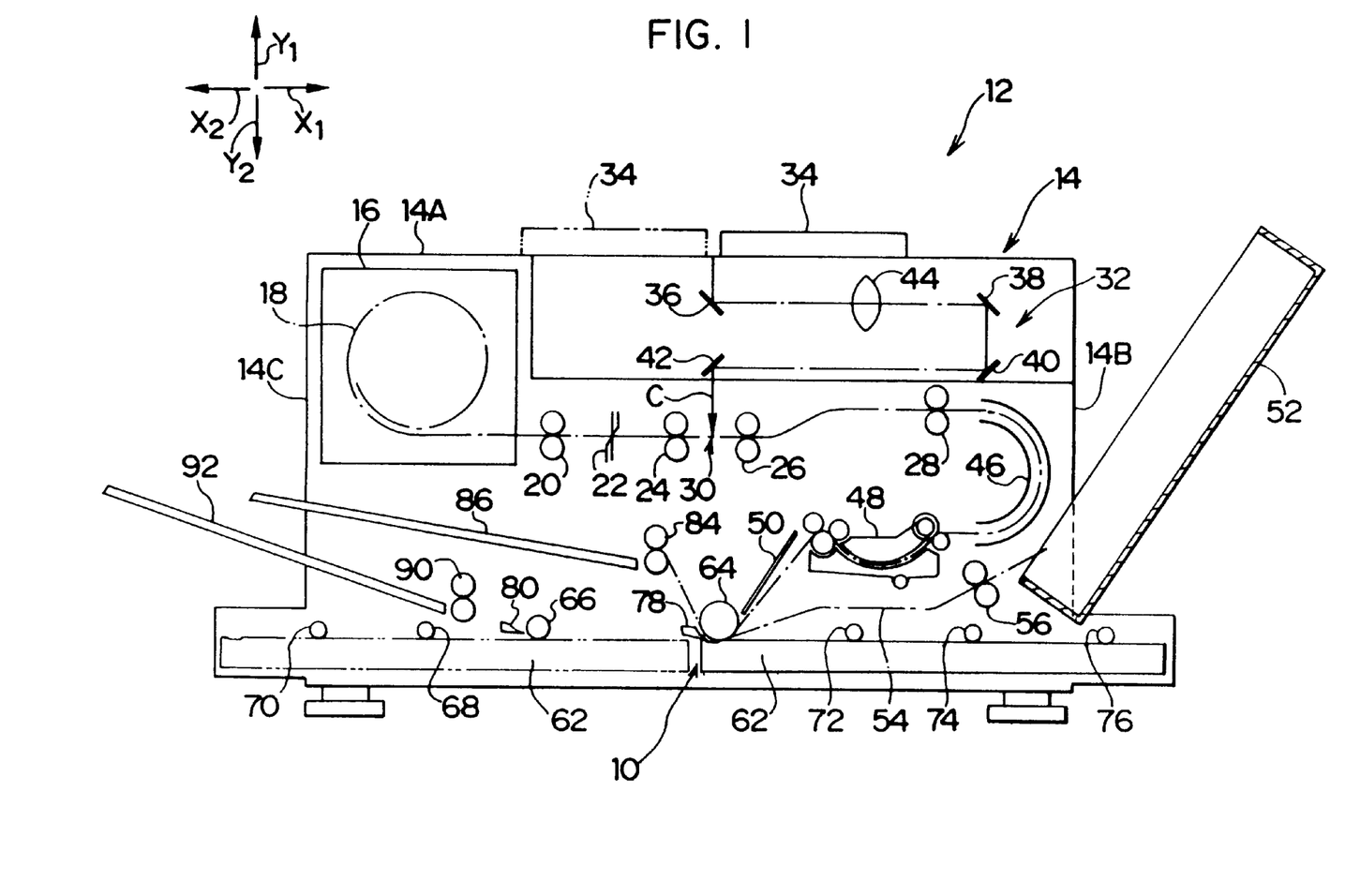
FIG. 1 is an elevational view which shows the overview of an image recording apparatus to which a heating device relating to an embodiment of the present invention is applied.

FIG. 1 shows the overview of the entire structure of an image recording apparatus 12 to which a heat development transfer section 10, which serves as a heating device relating to an embodiment of the present invention, is applied.

As shown in FIG. 1, the image recording apparatus 12 includes a machine stand 14 which is formed in the shape of a box. A photosensitive material magazine 16 is disposed within the machine stand 14, and a photosensitive material 18 is accommodated within the photosensitive material magazine 16 in a state in which the photosensitive material 18 is taken up in a roll shape. Further, nip rollers 20 and a cutter 22 are disposed on the side of the photosensitive material magazine 16. The nip rollers 20 and the cutter 22 are provided along the conveying path of the photosensitive material 18 and in the vicinity of a position at which the photosensitive material 18 exits from the photosensitive material magazine 16. The nip rollers 20 withdraw the predetermined length of the photosensitive material 18 from the photosensitive material magazine 16, and the cutter 22 cuts the predetermined length of the withdrawn photosensitive material 18. The cutter 22 is, for example, a rotary type cutter formed by a stationary blade and a mobile blade. As the mobile blade is moved vertically by a rotating cam or the like so as to engage the mobile blade and the stationary blade, the photosensitive material 18 can be cut.

Moreover, a plurality of conveying rollers 24, 26, 28 are provided within the machine stand 14. A guide plate (unillustrated) is disposed between the conveying rollers 24, 26, 28 so as to form the conveying path of the photosensitive material 18.

An exposure portion 30 is provided between the conveying rollers 24 and 26. A ray C is illuminated onto the photosensitive material 18 which passes through the portion (the exposure portion 30) and the photosensitive material 18 is thereby allowed to expose.

An exposure optical system 32, which guides the ray C to the exposure portion 30, is provided at the apparatus upper side (the side in the direction of arrow $Y_1$ in FIG. 1) of the exposure portion 30. Further, a scanning portion 34 is provided above the exposure optical system 32 and on the upper wall portion 14A of the machine stand 14. In a state in which a document (unillustrated), for example, a paper or the like, is disposed, the scanning portion 34 can be moved reciprocally on the upper wall portion 14A in the transverse direction (the directions of arrows $X_1$, $X_2$ in FIG. 1) of the apparatus. While the ray from a light source (unillustrated), which is accommodated within the machine stand 14, is reflected by the document toward the exposure optical system 32 in the lower direction (the direction of arrow $Y_2$ in FIG. 1) of the apparatus, the scanning portion 34 moves on the upper wall portion 14A from the right-hand side to the left-hand side (i.e., the direction of arrow $X_2$ in FIG. 1) in the transverse direction of the apparatus.

The exposure optical system 32 includes a plurality of mirrors 36, 38, 40, 42 and a lens 44. While the ray C reflected by the document is reflected successively by the mirrors 36, 38, 40, 42, an image is formed by the lens 44. The ray C is guided to the exposure portion 30 and is exposed onto the photosensitive material 18.

A U-turn portion 46 is provided on the side of the conveying rollers 28 and at the downstream side of the photosensitive material 18 in the conveying direction thereof. While the conveyed photosensitive material 18 is curved in a U-shape, the surface of the photosensitive material 18 exposed at the exposure portion 30 is reversed so as to face in the lower direction (the direction of arrow $Y_2$ in FIG. 1).

Further, a water application portion 48 is provided below the conveying rollers 28 and at the downstream side of the U-turn portion 46 in the conveying direction of the photosensitive material 18. Water serving as an image forming solvent is stored in the water application portion 48 and is applied to the photosensitive material 18 which passes through the water application portion 48.

Moreover, a guide plate 50 is disposed in the vicinity of a position at which the photosensitive material 18 exits from the water application portion 48, such that the photosensitive material 18 discharged from the water application portion 48 is guided to the heat development transfer section 10, which serves as a heating device and which is provided at the lower side of the machine stand 14.

Additionally, on the side of the water application portion 48, a box-shaped image receiving material tray 52 is removably inserted into a right side wall portion 14B of the machine stand 14. The image receiving materials 54, which were cut to predetermined lengths in advance, are accommodated within the image receiving material tray 52. Nip rollers 56 are disposed in the vicinity of the position at which the image receiving material 54 is exited from the image receiving material tray 52. The nip rollers 56 rotate with the rotations of the nip rollers 20, and the image receiving material 54 is withdrawn from the image receiving material tray 52. Then, the image receiving material 54 is conveyed to the heat development transfer section 10.

The heat development transfer section 10, to which the photosensitive material 18 and the image receiving material 54 are conveyed, is formed by a heating plate 62, attaching/peeling rollers 64, 66 serving as rotating rollers, presser rollers 68, 70, 72, 74, 76, a photosensitive material peeling pawl 78 serving as peeling means and an image receiving material peeling pawl 80 serving as peeling means.

Figure 6:
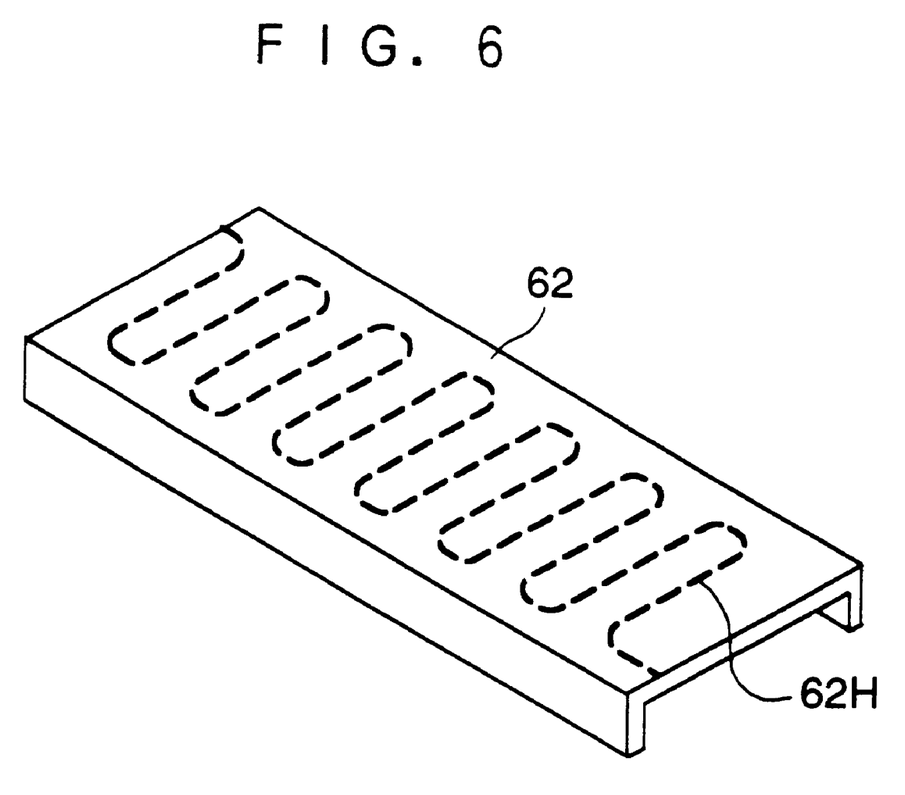
FIG. 6 is a perspective view of the heating plate.

The heating plate 62 is formed in the shape of a flat plate, and a linear heater 62H is attached to the back surface of the heating plate 62 as shown in FIG. 6. The surface of the heating plate 62 can be heated at a desirable temperature by the heater 62H.

Further, on the side of the heating plate 62, a longitudinal rack (unillustrated) is provided in the transverse direction (i.e., the directions of arrows $X_1$, $X_2$ in FIG. 1) of the apparatus. The rack is connected to a motor (unillustrated) provided within the machine stand 12 via a pinion (unillustrated). As the motor operates and the pinion operates, the heating plate 62 can be moved reciprocally in the transverse direction of the apparatus. The surface temperature of the heating plate 62 and the moving time thereof are set to the temperature and the time which correspond to the heat development transfer from the photosensitive material 18 to the image receiving material 54 on the heating plate 62.

The attaching/peeling rollers 64, 66 and the presser rollers 68 through 76 are disposed above the path of movement of the heating plate 62 (i.e., above the heating plate 62 shown by a solid line and a chain double-dashed line in FIG. 1). Namely, the heating plate 62 moves below and parallel to the attaching/peeling rollers 64, 66 and the presser rollers 68 through 76.

The attaching/peeling roller 64 is disposed in the vicinity of the lower portion of the guide plate 50. The attaching/peeling roller 64 is rotated at a speed in accordance with the moving speed of the heating plate 62. The photosensitive material 18, which was guided to the lower side of the device by the guide plate 50, and the image receiving material 54, which was conveyed by the nip rollers 56, are superposed and are attached onto the heating plate 62. Moreover, when the heating plate 62 passes below the attaching/peeling roller 64, the photosensitive material 18 and the image receiving material 54 are adhered to the heating plate 62 at predetermined pressure. In addition, a solenoid (unillustrated) is mounted to the attaching/peeling roller 64, such that the attaching/peeling roller 64 can be moved vertically by the solenoid in the height direction (the directions of arrows $Y_1$, $Y_2$ in FIG. 1) of the apparatus.

The diameter of the attaching/peeling roller 66 is smaller than that of the attaching/peeling roller 64. The attaching/peeling roller 66 is disposed on the left-hand side of the attaching/peeling roller 64. When the heating plate 62 passes below the attaching/peeling roller 66, the photosensitive material 18 and the image receiving material 54 are adhered to the heating plate 62 at predetermined pressure by the attaching/peeling roller 66. In addition, a solenoid (unillustrated) is mounted to the attaching/peeling roller 66, such that the attaching/peeling roller 66 can be moved vertically by the solenoid in the height direction (the directions of arrows $Y_1$, $Y_2$ in FIG. 1) of the apparatus.

In addition, the presser rollers 68, 70 are disposed on the left-hand side of the attaching/peeling roller 66, and the presser rollers 72, 74, 76 are disposed on the right-hand side of the attaching peeling roller 64. The diameters of the presser rollers 68 through 76 are smaller than that of the attaching/peeling roller 66. When the heating plate 62, to which the photosensitive material 18 and the image receiving material 54 were attached, passes below the presser rollers 68 through 76, the presser rollers 68 through 76 press the photosensitive material 18 and the image receiving material 54 while being rotated by frictional resistance with the photosensitive material 18.

Figure 2:
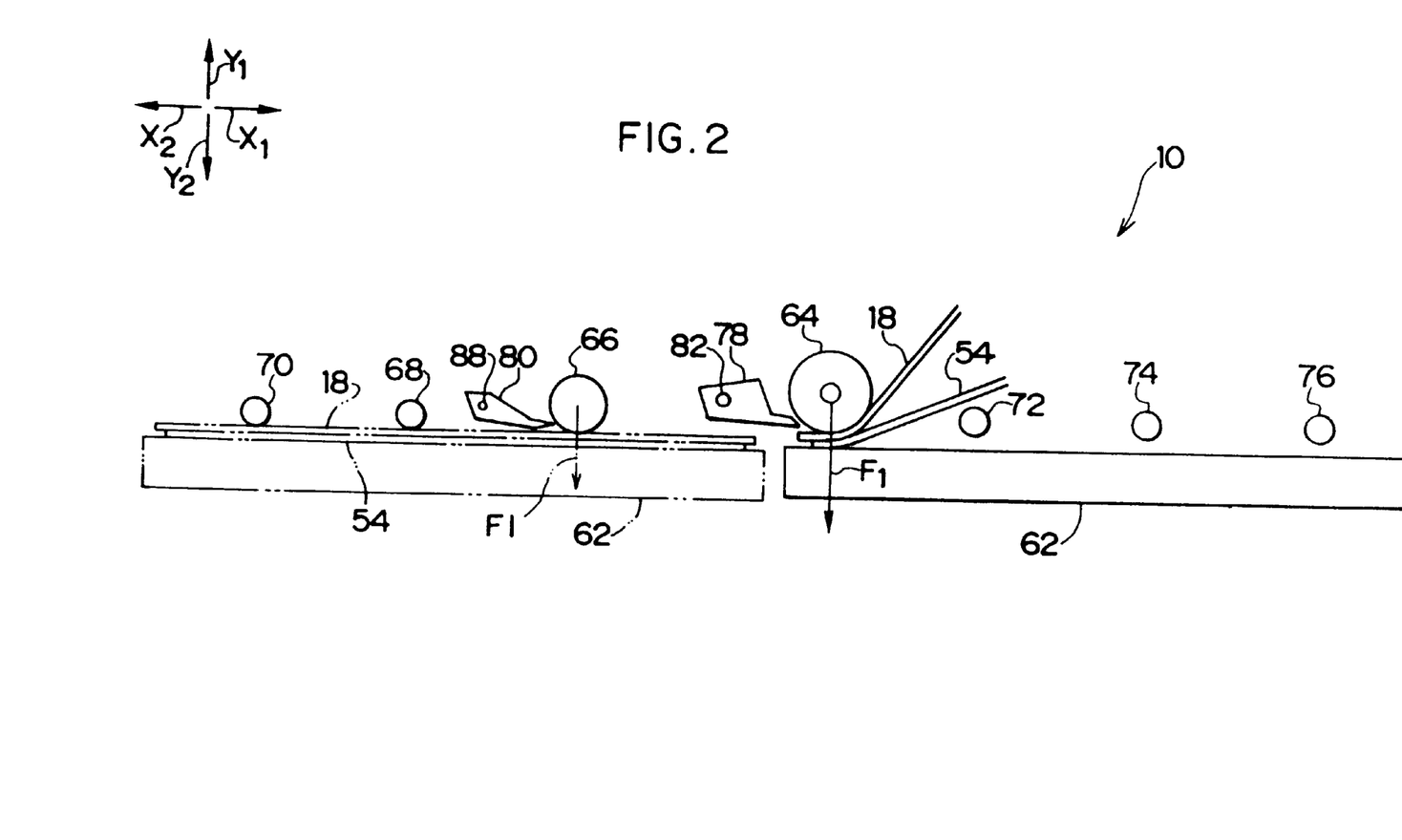
FIG. 2 is an elevational view of the heating device relating to the embodiment of the present invention and showing the state in which a photosensitive material and an image receiving material are attached to a heating plate.
Figure 4:
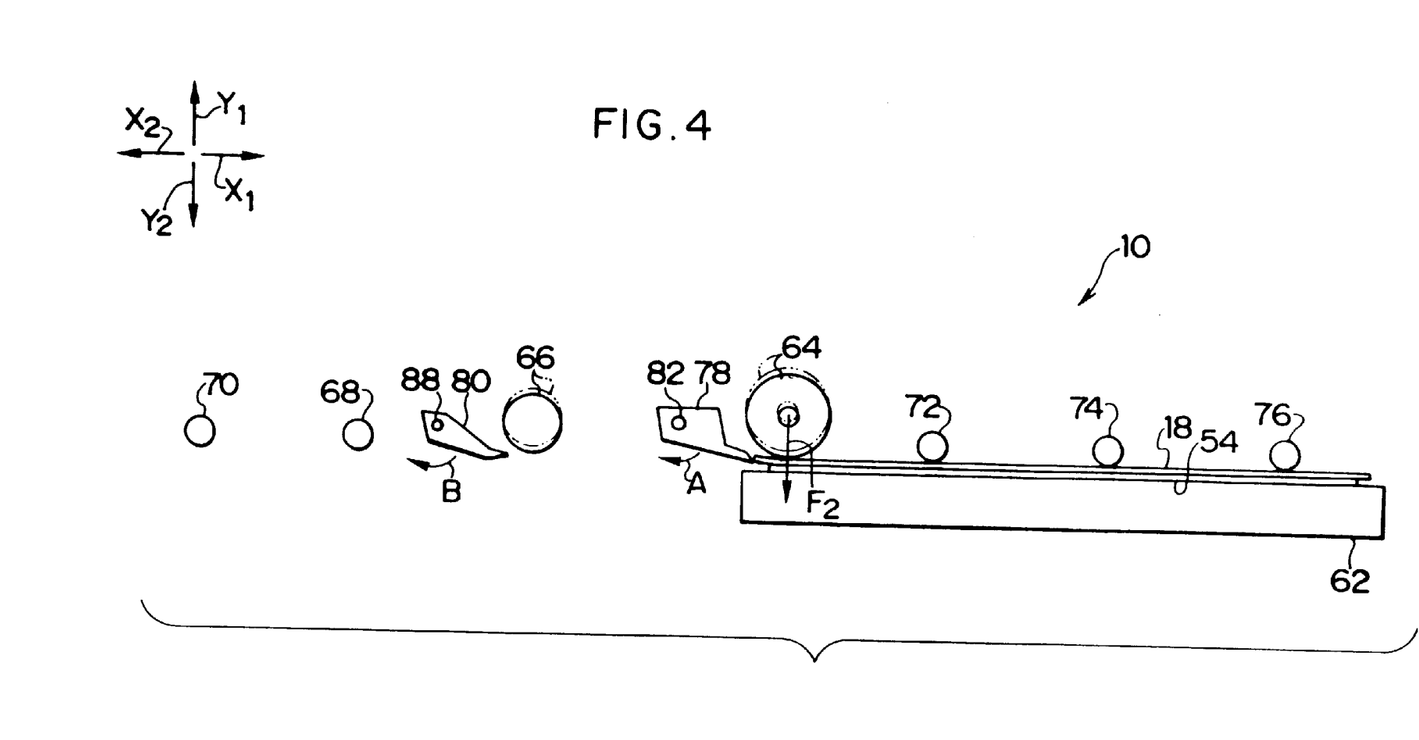
FIG. 4 is an elevational view of the heating device relating to the embodiment of the present invention and showing the state in which the heating plate is moved toward the right-hand side of the device from the state shown in FIG. 3.

The photosensitive material peeling pawl 78 is disposed on the left-hand side of the attaching/peeling roller 64. As shown in FIGS. 2 and 4, the photosensitive material peeling pawl 78 is swingable around a shaft 82 by a solenoid (unillustrated) at a predetermined angle and swings with the reciprocal movement of the heating plate 62. In a state in which the photosensitive material peeling pawl 78 swings in the lower direction (i.e., the direction of arrow A in FIG. 4) of the apparatus, the photosensitive material 18, which was attached onto the heating plate 62 together with the image receiving material 54, can be peeled therefrom.

Moreover, photosensitive material discharge rollers 84 are provided in the left and upper direction of the photosensitive material peeling pawl 78, and a box-shaped photosensitive material discard tray 86 is provided near the left-hand side of the photosensitive material discharge rollers 84. While the photosensitive material discharge rollers 84 rotate, the photosensitive material discharge rollers 84 hold the photosensitive material 18 which was peeled by the photosensitive material peeling pawl 78 and guided to the upper direction of the apparatus. Accordingly, the photosensitive material 18 can be conveyed to the nearby photosensitive material discard tray 86. The photosensitive material discard tray 86 is inserted removably into the left side wall portion 14C of the machine stand 14. Thus, the photosensitive material 18 conveyed by the photosensitive material discharge rollers 84 is stacked in the photosensitive material discard tray 86. At the same time, the accommodated photosensitive material 18 can be discarded by removing the photosensitive material discard tray 86 from the machine stand 14.

Figure 5:
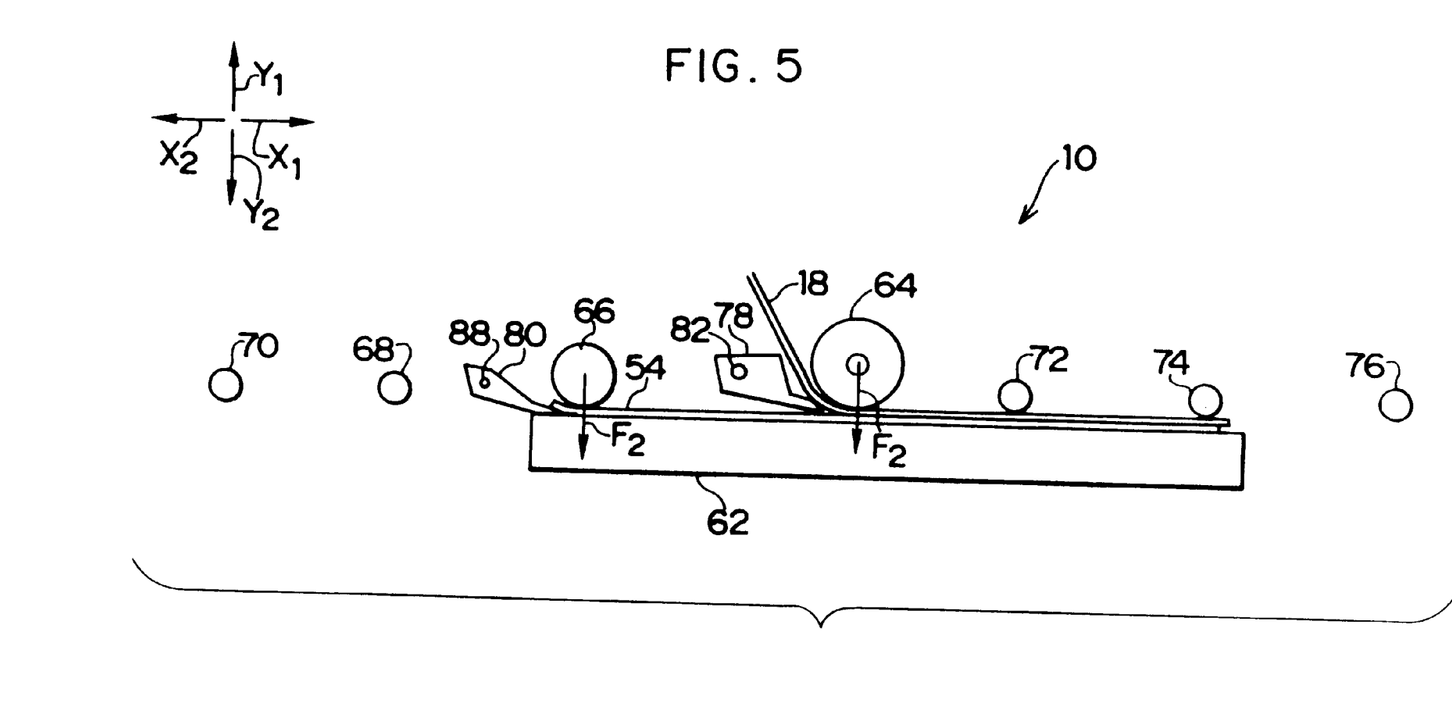
FIG. 5 is an elevational view of the heating device relating to the embodiment of the present invention and showing the state in which the photosensitive material and the image receiving material are peeled from the heating plate.

The image receiving material peeling pawl 80 is disposed on the left-hand side of the attaching/peeling roller 66. As shown in FIGS. 2, 4 and 5, the image receiving material peeling pawl 80 is swingable around a shaft 88 by a solenoid (unillustrated) at a predetermined angle and swings with the reciprocal movement of the heating plate 62. In a state in which the image receiving material peeling pawl 80 swings in the lower direction (i.e., the direction of arrow B in FIG. 4) of the apparatus, the image receiving material 54 attached onto the heating plate 62 can be peeled therefrom (see FIG. 5).

Moreover, image receiving material discharge rollers 90 are provided in the left and upper direction of the image receiving material peeling pawl 80, and a box-shaped image receiving material discharge tray 92 is provided near the left-hand side of the image receiving material discharge rollers 90. While the image receiving material discharge rollers 90 rotate, the image receiving material discharge rollers 90 hold the image receiving material 54 which was peeled by the image receiving material peeling pawl 80 and guided to the upper direction of the apparatus. Accordingly, the image receiving material 54 can be conveyed to the nearby image receiving material discharge tray 92. The image receiving material discharge tray 92 is provided at the left side wall portion 14C of the machine stand 14 in a state in which one end of the image receiving material discharge tray 92 projects outwardly from the machine stand 14. The image receiving material 54 conveyed by the image receiving material discharge rollers 90 is stacked in the image receiving material discharge tray 92. The stacked image receiving material 54 can be taken out from the outer side of the machine stand 14.

Next, the operation of the heat development transfer section 10 which serves as a heating device relating to the present embodiment will be explained through the processes of the image recording apparatus 12 of the present invention.

In the above-structured image recording apparatus 12, as the scanning portion 34 moves from the right-hand side of the apparatus to the left-hand side thereof, i.e., the scanning portion 34 moves from the position shown by a solid line to the position shown by a chain double-dashed line in FIG. 1, the nip rollers 20 operate. When the photosensitive material 18 is withdrawn from the photosensitive material magazine 16, the cutter 22 operates, and the photosensitive material 18 is cut to predetermined lengths and conveyed to the exposure portion 30. Next, when the photosensitive material 18 passes through the exposure portion 30, the photosensitive material 18 positioned at the exposure portion 30 is scan-exposed by the ray C. Accordingly, latent images (images) are formed on the photosensitive material 18.

When the exposure of the ray C is finished, the photosensitive material 18 is inverted by the U-turn portion 46, and further, conveyed to the water application portion 48 where water is applied to the photosensitive material 18. The photosensitive material 18, to which water has been applied and which has been discharged from the water application portion 48, is guided to the heat development transfer section 10 by the guide plate 50.

On the other hand, synchronizing with the conveyance and scan-exposure of the photosensitive material 18, the nip rollers 56 operate, the image receiving material 54 is withdrawn from the image receiving material tray 52, and the image receiving material 54 waits immediately before the heat development transfer section 10. When the photosensitive material 18 is conveyed to the heat development transfer section 10, the conveyance of the image receiving material 54 is resumed.

In this state, as shown in FIG. 2, the motor operates and the heating plate 62 starts to move from an initial position (the position shown by a solid line in FIG. 2) to the left-hand side of the apparatus. Further, when the attaching/peeling rollers 64, 66 start to rotate in accordance with the moving direction and the moving speed of the heating plate 62, in a state in which the photosensitive material 18 and the image receiving material 54 are superposed, the photosensitive material 18 and the image receiving material 54 are attached in succession from the distal end sides thereof onto the heating plate 62 and heated by the heating plate 62. The photosensitive material 18 and the image receiving material 54 are attached onto the heating plate 62 in a state in which the distal end of the photosensitive material 18 protrudes further toward the conveying direction downstream side thereof than that of the image receiving material 54 (i.e., the state in which the distal end of the photosensitive material 18 juts out further than that of the image receiving material 54). In this state, since the attaching/peeling roller 64 is disposed at its lowest position, the photosensitive material 18 and the image receiving material 54 receive pressure $F_1$ from the attaching/peeling roller 64 and are attached to the heating plate 62. Further, in this state, the photosensitive material peeling pawl 78 is held above the heating plate 62 by the solenoid, and the photosensitive material 18 and the image receiving material 54 move to the left-hand side of the apparatus in a state in which the photosensitive material 18 and the image receiving material 54 are attached to the heating plate 62. Moreover, in this state, because the attaching/peeling roller 66 is disposed at its lowest position in the same manner as the attaching/peeling roller 64, when the heating plate moves below the attaching/peeling roller 66, the photosensitive material 18 and the image receiving material 54 receive pressure F1, which is the same as the previous pressure received from the attaching/peeling roller 64, from the attaching/peeling roller 66 and are adhered to the heating plate 62. Still further, in this state, the image receiving material peeling pawl 80 is held above the heating plate 62 by the solenoid, and the photosensitive material 18 and the image receiving material 54 move to the left-hand side of the apparatus in a state in which the photosensitive material 18 and the image receiving material 54 are attached to the heating plate 62.

When the heating plate 62 moves further toward the left, the presser rollers 68, 70 rotate due to the frictional resistance with the photosensitive material 18. Consequently, the photosensitive material 18 and the image receiving material 54 are pressed by the presser rollers 68, 70 (i.e., the photosensitive material 18 and the image receiving material 54 are nipped between the presser rollers 68, 70 and the heating plate 62).

Figure 3:
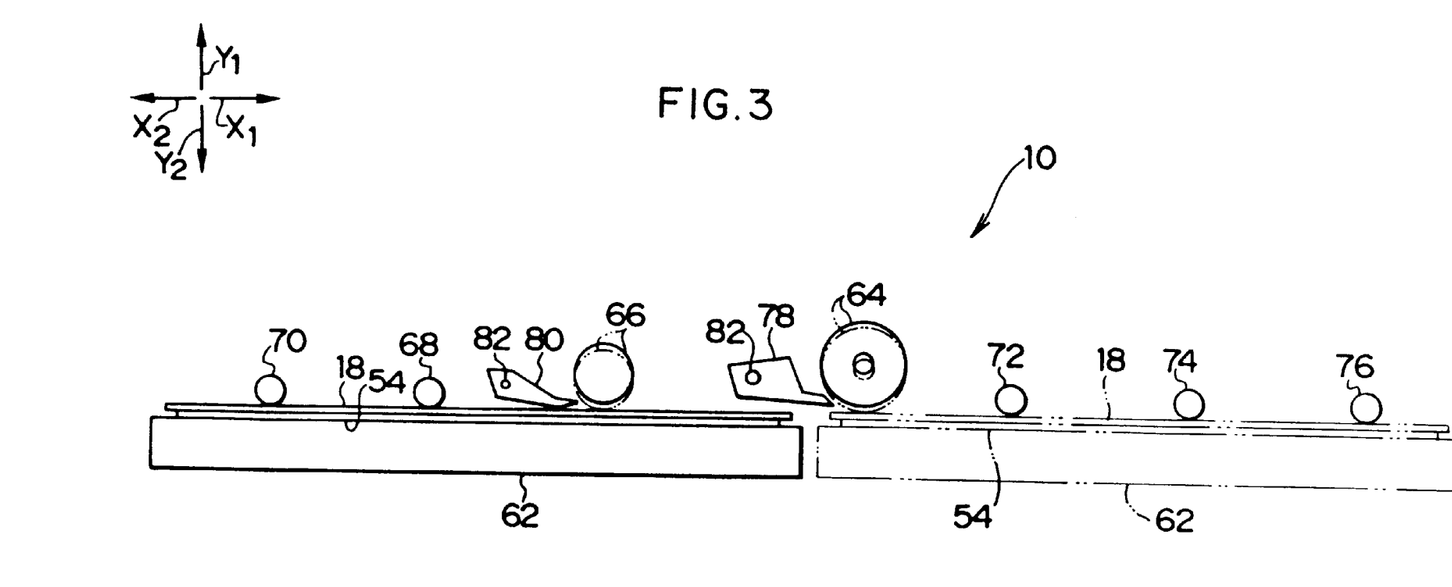
FIG. 3 is an elevational view of the heating device relating to the embodiment of the present invention and showing the state in which the heating plate to which the photosensitive material and the image receiving material were attached is moved toward the left-hand side of the device.

Next, when the heating plate 62 moves to the position shown by a solid line in FIG. 3, the heating plate 62 temporarily stops. At this time, the respective solenoids of the attaching/peeling rollers 64, 66 operate. In a case in which the heating plate 62 is positioned below the attaching/peeling rollers 64, 66, the attaching/peeling rollers 64, 66 are displaced by predetermined strokes in the upper direction of the apparatus to the positions which do not contact the photosensitive material 18 (i.e., the positions shown by a chain double-dashed line to the positions shown by a solid line in FIG. 3). The motor of the driving device is reversed from this state, and the heating plate 62 is moved to the right-hand side of the apparatus until the heating plate 62 reaches the initial position (i.e., the position shown by a chain double-dashed line in FIG. 3). In this state, because the attaching/peeling rollers 64, 66 are positioned so as to not contact the photosensitive material 18, the attaching/peeling rollers 64, 66, which rotate in the direction opposite the moving direction of the heating plate 62, do not contact the photosensitive material 18 attached to the heating plate 62. Therefore, deviations, cockles, or the like of the photosensitive material 18 and the image receiving material 54 can be prevented from occurring.

Further, as shown in FIG. 4, when the heating plate 62 moves to the initial position, and after the heating plate 62 stops temporarily, the driving device is inverted again so that the heating plate 62 starts to move to the left-hand side of the apparatus. At this time, the respective solenoids of the attaching/peeling rollers 64, 66 operate, and the attaching/peeling rollers 64, 66 are displaced by predetermined strokes in the lower direction of the apparatus (i.e., the positions shown by a chain double-dashed line to the positions shown by a solid line in FIG. 4). In this case, the positions of the attaching/peeling rollers 64,66 are slightly above the initial positions thereof (i.e., the positions at which the photosensitive material 18 and the image receiving material 54 are pressed by pressure $F_1$). At this time, the photosensitive material peeling pawl 78 is swung around the shaft 82 by the solenoid at a predetermined angle in the direction of arrow A (i.e., the downward direction of the apparatus), and the photosensitive material peeling pawl 80 is swung around the shaft 88 by the solenoid at a predetermined angle in the direction of arrow B (i.e., the downward direction of the device).

When the heating plate 62 moves to the left-hand side of the apparatus in this state, the photosensitive material 18 and the image receiving material 54 are pressed by the attaching/peeling roller 64 at pressure $F_2$ which is smaller than the previous pressure $F_1$. As a result, when the heating plate 62 moves below the attaching/peeling roller 64, it is extremely easy for the photosensitive material 18, which to be in advance of the image receiving material 54, is peeled by the photosensitive material peeling pawl 78 from the heating plate 62. Then, the photosensitive material 18 is nipped by the photosensitive material discharge rollers 84 and is stacked in the photosensitive material discard tray 86. The time between which the photosensitive material 18 and the image receiving material 54 are attached onto the heating plate 62 and the photosensitive material 18 is peeled therefrom is regarded as the heat development transfer time. During this time, the images are transferred from the photosensitive material 18 to the image receiving material 54. During this time, the photosensitive material 18 and the image receiving material 54 are directly attached onto the heating plate 62, and further, when the heating plate 62 moves reciprocally, the entire surfaces of the photosensitive material 18 and the image receiving material 54 are adhered to the heating plate 62. Accordingly, the photosensitive material 18 can be heated in an extremely short time and extremely good images can be heat-development-transferred.

On the other hand, as shown in FIG. 5, when the heating plate 62 moves from this position to the further left-hand side of the device and the image receiving material 54 passes below the attaching/peeling roller 66, the image receiving material 54 is peeled from the heating plate 62 by the image receiving material peeling pawl 80. In this state, because the attaching/peeling roller 66 is displaced slightly above the initial position, the image receiving material 54 is pressed by the attaching/peeling roller 66 at pressure $F_2$ which is smaller than the previous pressure $F_1$. As a result, it is extremely easy for the image receiving material 54 to be peeled by the image receiving material peeling pawl 80 from the heating plate 62. The image receiving material 54 which has been peeled by the image receiving material peeling pawl 80 is nipped by the image receiving material discharge rollers 90 and is stacked in the image receiving material discharge tray 92.

Further, after the heating plate 62 moves so that the peeling of the photosensitive material 18 and the image receiving material 54 is finished, the respective attaching/peeling rollers 64, 66 are displaced in the downward direction of the apparatus by the solenoids so as to press the heating plate 62. In this state, the heating plate 62 is moved to the initial position (the position shown in FIG. 2).

As described hereinbefore, in the heat development transfer section (the heating device) 10 of the image recording apparatus 12 of the present invention, the photosensitive material 18 and the image receiving material 54 are directly attached onto the heating plate 62, and further, the heating plate 62 is moved reciprocally so that the entire surfaces of the photosensitive material 18 and the image receiving material 54 are adhered to the heating plate 62 by the attaching/removing rollers 64, 66. Consequently, the photosensitive material 18 can be heated in an extremely short time, and extremely good images can be heat-development-transferred.

Moreover, as compared to the conventional heating device which uses the circular heating drum, because the heating means is the plate-shaped heating plate 62, it is not necessary to press invariably the end portions of the photosensitive material 18 and the image receiving material 54 against the heating plate 62. Also, there is no need to provide a plurality of rollers or endless pressing/contacting belts required for a conventional heating device which uses a heating drum. Thus, the cost of the device is reduced.

In the present embodiment, the heating plate 62 moves reciprocally in the transverse direction of the apparatus. However, when the heat development transfer is effected, the heating plate 62 may be moved only in one direction of the transverse direction of the apparatus. In this case, since a longer moving stroke of the heating plate 62 is required, as far as the compactness of the machine stand 14 is concerned, the present embodiment is superior to the above-described apparatus. However, in a case in which the positions of other members such as the photosensitive material magazine 16, the exposure portion 30, the water application portion 48 or the like are considered, the structure in which the heating plate 62 is moved only in one direction of the transverse direction of the apparatus may be better than the structure of the present embodiment.

In the present embodiment, a rack is provided on the side of the heating plate 62 and is connected to the motor via the pinion so that the heating plate 62 is moved. However, the structure of moving the heating plate 62 is not limited to the same. For example, it is possible that the length direction end portions of the heating plate 62 (the front end portion and the back end portion of the heating plate 62 on the page surface in FIG. 1) are nipped by a plurality of rollers formed by an elastic member such as a rubber or the like, that any one of the rollers is connected to the motor, and that the heating plate 62 is moved by the rotation of the roller.

Further, in the present embodiment, the respective attaching/peeling rollers 64, 66 are vertically moved by the solenoids. However, the structure of vertically moving the attaching/peeling rollers 64, 66 is not limited to the same. For example, it is possible that the driving force of the motor is conveyed to the attaching/peeling rollers 64, 66 by mechanical conveying means such as a rack, cam, or the like, and that the attaching/peeling rollers 64, 66 are vertically moved due to the driving force of the motor.

Moreover, in the present embodiment, the photosensitive material peeling pawl 78 and the image receiving material peeling pawl 80 are rotated by the solenoids. However, for example, it is possible that the driving force of the motor can be conveyed to the photosensitive material peeling pawl 78 and the image receiving material peeling pawl 80 by mechanical conveying means such as a rack, cam, or the like, and the photosensitive material peeling pawl 78 and the image receiving material peeling pawl 80 are rotated due to the driving force of the motor. Still further, the attaching/peeling roller 64 and the photosensitive material peeling pawl 78 may be connected by the above-described mechanical conveying means, and similarly, the attaching/peeling roller 66 and the image receiving material peeling pawl 80 may be connected by the above-described mechanical conveying means. Each of the connected members are thereby interlocked.

As described hereinbefore, the heating device relating to the present invention is different from the conventional type of heating device in which the photosensitive material and the image receiving material are held and conveyed by a pair of endless belts. The photosensitive material and the image receiving material are directly loaded on the heating plate, and further, adhered to the heating plate by the attaching members (the rollers). Accordingly, the photosensitive material and the image receiving material can be heated quickly and uniformly so as to be heat-development-transferred. Moreover, the heating device relating to the present embodiment is different from the conventional type of heating device which uses the heating drum, and it is not necessary to press the entire surfaces of the photosensitive material and the image receiving material against the heating plate. Therefore, the number of parts can be greatly reduced.

While the embodiments of the present invention, as herein disclosed, constitute a preferred form, it is to be understood that other forms might be adopted.

What is claimed is:

1. A heating device in which a photosensitive material, onto which images have been exposed, and an image receiving material, to which the images of said photosensitive material are transferred, are superposed and heated so as to effect heat development transfer, comprising:

a heating plate which is formed in the shape of a flat plate having a surface and which is provided so as to be movable in predetermined directions, said heating plate heating said photosensitive material and said image receiving material while moving in said predetermined directions in a state in which said photosensitive material and said image receiving material are loaded on said surface of said heating plate; and attaching members which are disposed so as to oppose said heating plate, said attaching members for applying predetermined pressures to said photosensitive material and said image receiving material while said photosensitive material and said image receiving material are nipped between said attaching members and said heating plate such that said photosensitive material and said image receiving material are adhered to said heating plate as said heating plate undergoes a first forward movement.

2. A heating device according to claim 1, wherein said heating plate is provided so as to be able to move reciprocally within a predetermined range, wherein said attaching members are rotating rollers, wherein peeling pawls are provided in the vicinities of said rotating rollers and peel said photosensitive material and said image receiving material from said heating plate in conjunction with said reciprocal movement of said heating plate, wherein when said heating plate moves backward, pressures of said rotating rollers are released, and wherein when said heating plate moves forward again, said peeling pawls are operated so as to peel said photosensitive material and said image receiving material.

3. A heating device according to claim 2, wherein said pressures of said rotating rollers can be increased and decreased, and when said heating plate moves forward again, the pressures of said rotating rollers are smaller than the pressures of said rotating rollers at the first forward movement of said heating plate.

4. A heating device according to claim 1, wherein said heating plate contains a linear heater therein by which the surface of said heating plate is heated to a desirable temperature.

5. A heating device according to claim 1, wherein a surface temperature and a moving time of said heating plate are set to the temperature and the time which correspond to the heat development transfer from the photosensitive material to the image receiving material on said heating plate.

6. A heating device according to claim 1, wherein said attaching members are disposed above the path of movement of said heating plate, and said heating plate, on which said photosensitive material and said image receiving material are loaded, moves below and parallel to said attaching members.

7. A heating device according to claim 2, wherein said rotating rollers include a first rotating roller which superposes said photosensitive material and said image receiving material for attaching said photosensitive material and said image receiving material onto said heating plate, and a second rotating roller which is disposed at the downstream side of said first rotating roller in the forward direction of said heating plate and whose diameter is smaller than the diameter of said first rotating roller.

8. A heating device according to claim 7, wherein said rotating rollers further include at least one presser roller whose diameter is smaller than the diameter of said second rotating roller, and when said heating plate, to which said photosensitive material and said image receiving material are attached, passes below said presser roller, said presser roller presses said photosensitive material and said image receiving material while being rotated due to frictional resistance with said photosensitive material.

9. A heating device according to claim 7, wherein said peeling pawls include a photosensitive material peeling pawl which is disposed in the downstream side vicinity of said first rotating roller in the forward direction of said heating plate for peeling said photosensitive material from said heating plate, and an image receiving material peeling which is disposed in the downstream side vicinity of said second rotating roller in the forward direction of said heating plate for peeling said image receiving material from said heating plate.

10. A heating device according to claim 9, wherein said photosensitive material peeling pawl is swingable around a shaft at a predetermined angle and swings with the reciprocal movement of said heating plate so that when said photosensitive material peeling pawl swings in the downward direction of the device, said photosensitive material, which is attached onto said heating plate with said image receiving material, is peeled.

11. A heating device according to claim 9, wherein said image receiving material peeling pawl is swingable around a shaft at a predetermined angle and swings with the reciprocal movement of said heating plate, so that when said image receiving material peeling pawl swings in the downward direction of the device, said image receiving material which is attached onto said heating plate is peeled.

12. A heating device in which a photosensitive material, onto which images have been exposed, and an image receiving material, to which the images of said photosensitive material are transferred, are superposed and heated so as to effect heat development transfer, comprising:

a heating plate which is formed in the shape of a flat plate having a surface and which is provided so as to be reciprocally movable in predetermined directions, said heating plate heating said photosensitive material and said image receiving material while moving in said predetermined directions in a state in which said photosensitive material and said image receiving material are loaded on said surface of said heating plate;

attaching members which are disposed so as to oppose said heating plate, said attaching members for applying predetermined pressures to said photosensitive material and said image receiving material while said photosensitive material and said image receiving material are nipped between said attaching members and said heating plate such that said photosensitive material and said image receiving material are adhered to said heating plate as said heating plate undergoes a first forward movement; and peeling pawls, which are provided in the vicinities of said attaching members, for peeling said photosensitive material and said image receiving material from said heating plate in conjunction with said reciprocal movement of said heating plate, wherein when said heating plate moves forward again, said peeling pawls are operated so as to peel said photosensitive material and said image receiving material.

13. A heating device according to claim 12, wherein said pressures of said attaching members can be increased and decreased, and when said heating plate moves forward again, the pressures of said attaching members are smaller than the pressures of said rotating rollers at the first forward movement of said heating plate.

14. A heating device according to claim 12, wherein said heating plate includes a linear heater therein by which the surface of said heating plate is heated to a desirable temperature.

15. A heating device according to claim 12, wherein a surface temperature and a moving time of said heating plate are set to the temperature and the time which correspond to heat development transfer from the photosensitive material to the image receiving material on said heating plate.

16. A heating device according to claim 12, wherein said attaching members include a first rotating roller which superposes said photosensitive material and said image receiving material for attaching said photosensitive material and said image receiving material onto said heating plate, and a second rotating roller which is disposed at the downstream side of said first rotating roller in the forward direction of said heating plate, wherein the diameter of said second rotating roller is smaller than the diameter of said first rotating roller.

17. A heating device according to claim 16, wherein said attaching members further include at least one presser roller whose diameter is smaller than the diameter of said second rotating roller, and when said heating plate, to which said photosensitive material and said image receiving material are attached, passes below said presser roller, said presser roller presses said photosensitive material and said image receiving material while being rotated due to frictional resistance with said photosensitive material.

18. A heating device according to claim 16, wherein said peeling pawls include a photosensitive material peeling pawl which is disposed in the downstream side vicinity of said first rotating roller in the forward direction of said heating plate for peeling said photosensitive material from said heating plate, and an image receiving material peeling pawl which is disposed in the downstream side vicinity of said second rotating roller in the forward direction of said heating plate for peeling said image receiving material from said heating plate.

19. A heating device according to claim 18, wherein said photosensitive material peeling pawl is swingable around a shaft at a predetermined angle and swings with the reciprocal movement of said heating plate so that when said photosensitive material peeling pawl swings in the downward direction of the device, said photosensitive material which is attached onto said heating plate with said image receiving material is peeled.

20. A heating device according to claim 18, wherein said image receiving material peeling pawl is swingable around a shaft at a predetermined angle and swings with the reciprocal movement of said heating plate so that when said image receiving material peeling pawl swings in the downward direction of the device, said image receiving material which is attached onto said heating plate is peeled.

* * * * *